United States Patent [19]

Fujii

[11] Patent Number: 4,799,581

[45] Date of Patent: Jan. 24, 1989

[54] APPARATUS FOR LOADING SPARE WHEELS ON VEHICLE BODIES

[75] Inventor: Hiroshi Fujii, Higashihiroshima, Japan

[73] Assignee: Mazda Motor Corporation, Japan

[21] Appl. No.: 122,184

[22] Filed: Nov. 18, 1987

[30] Foreign Application Priority Data

Nov. 19, 1986 [JP] Japan .................. 61-177987[U]

[51] Int. Cl.⁴ ............................................ B65G 43/00
[52] U.S. Cl. ...................................... 198/341; 29/703;
29/430; 901/7; 198/369
[58] Field of Search ...................... 414/729, 225; 901/6,
901/7, 8; 198/341, 369; 29/703, 430

[56] References Cited

U.S. PATENT DOCUMENTS 3,283,918 11/1966 Devol .
3,818,290 6/1974 Harper et al. ................. 901/7 X
3,958,682 5/1976 Martin .
4,543,702 10/1985 Wada ............................. 901/7 X
4,589,184 5/1986 Asano et al. .................. 414/225 X
4,589,199 5/1986 Ohtaki et al. .................. 901/7 X

FOREIGN PATENT DOCUMENTS

50-60775 10/1974 Japan .
2133749 8/1984 United Kingdom ......... 228/DIG. 1

Primary Examiner—Robert J. Spar
Assistant Examiner—Donald W. Underwood
Attorney, Agent, or Firm—Gerald J. Ferguson, Jr.

[57] ABSTRACT

An apparatus for loading a spare wheel on a vehicle body comprises a robot operative to load the spare wheel on a predetermined portion provided in the vehicle body supported and transported by a carrier mounted on a vehicle body conveying device, a speed detecting device including a movable mechanism which engages temporarily with the carrier to move together with the carrier and detecting a speed of transportation of the vehicle body based on a speed of movement of the movable mechanism, and a robot moving device for shifting the robot along a direction of transportation of the vehicle body at a speed determined in response to the speed detected by the speed detecting means.

8 Claims, 4 Drawing Sheets

APPARATUS FOR LOADING SPARE WHEELS ON VEHICLE BODIES

BACKGROUND OF THE INVENTION

1. Field of the Invention

The present invention relates generally to apparatus for loading spare wheels on vehicle bodies, and more particularly, to a spare wheel loading apparatus for loading automatically spare wheels on spare wheel holding portions provided in vehicle bodies which are supported and transported successively by carriers mounted on a vehicle body carrying conveyor.

2. Description of the Prior Art

In a vehicle body assembly line, a vehicle body is supported and transported by a carrier, such as a hanger, mounted on a vehicle body carrying conveyor of, for example, the trolley type to be subjected to equipments of various parts and components. Although work for loading a spare wheel on a spare wheel holding portion provided in, for example, a trunk of the vehicle body in the vehicle body assembly line has been previously in reliance on manual labor, there has been recently proposed, for reduction of labor, such technology as to load automatically spare wheels on vehicle bodies transported successively by the vehicle body carrying conveyor in the vehicle body assembly line.

One of previously proposed spare wheel loading apparatus for loading automatically spare wheels on vehicle bodies is disclosed in Japanese patent application published before examination under publication No. 50/60775. This previously proposed spare wheel loading apparatus is composed of a robot having an arm for catching a spare wheel and move the same into each of vehicle bodies in process of transportation by a vehicle body carrying conveyor, a servo valve disposed on a pressure oil path to be engaged temporarily with each of hangers mounted on the vehicle body carrying conveyor for supporting the vehicle bodies and operative to open the pressure oil path on the occasion of engagement with one of the hangers conveying the vehicle bodies, a first cylinder having first and second oil chambers and operative to cause the servo valve to move together with the hanger engaging therewith when a pressure oil is supplied through the servo valve to the first oil chamber, and a second cylinder supplied with the pressure oil discharged from the second oil chamber of the first cylinder for rotating the arm of the robot.

In the case where the spare wheels are loaded automatically on the vehicle bodies by the spare wheel loading apparatus proposed previously as mentioned above, however, it is very difficult to cause the speed of rotation of the arm of the robot to coincide with the speed of movement of the vehicle body which is transported linearly and the rotation of the arm of the robot is apt to get behind to the vehicle body transported. This results in that a position to which the spare wheel is removed from the arm of the robot is apt to be deviated from a spare wheel holding portion provided in the vehicle body and therefore it is feared that a situation wherein the spare wheel is not loaded properly on the vehicle body arises.

In order to avoid such problems as mentioned above, it is considered to provide an improved spare wheel loading apparatus which includes a robot having an arm operating with a predetermined working path and at a predetermined working speed to load a spare wheel on each of vehicle bodies transported by a vehicle body carrying conveyor, a robot moving device for shifting the robot along a direction of transportation of the vehicle body, and a speed sensor for detecting a speed of transportation of the vehicle body based on a signal obtained from a driving device, such as a motor, for driving the vehicle body carrying conveyor, and in which the robot moving device is driven to shift the robot in accordance with the speed of transportation of the vehicle body detected by the speed sensor, so that the robot is caused to shift along the direction of transportation of the vehicle body at the same moving speed as the vehicle body and operate to load the spare wheel on a spare wheel holding portion provided in the vehicle body in process of transportation. With such an improved spare wheel loading apparatus, since the robot having the arm which operates to load the spare wheel on the vehicle body transported by the vehicle body carrying conveyor is moved substantially together with the vehicle body and therefore the spare wheel can be loaded correctly on the spare wheel holding portion provided in the vehicle body.

However, in the above mentioned improved spare wheel loading apparatus constituted as described above, in actual, the speed of transportation of the vehicle body detected by the speed sensor is ready to include errors resulting from slips between the vehicle body carrying conveyor and the driving device for driving the vehicle body carrying conveyor, aged deterioration of the vehicle body carrying conveyor, or other undesirable but unavoidable causes. In the case where the speed of transportation of the vehicle body detected by the speed sensor includes such errors, a relative positional deviation arises between the vehicle body transported by the vehicle body carrying conveyor and the arm of robot, so that the spare wheel is prevented from being loaded properly on the spare wheel holding portion provided in the vehicle body. Especially, in the event of the relative positional deviation brought about on a large scale, it is feared that the vehicle body transported by the vehicle body carrying conveyor and the arm of robot interfere with each other.

OBJECTS AND SUMMARY OF THE INVENTION

Accordingly, it is an object of the present invention to provide an apparatus for loading a spare wheel on a vehicle body which avoids the foregoing problems encountered with the prior art.

Another object on the present invention is to provide an apparatus for loading a spare wheel on a vehicle body, which includes a robot having an arm operating under a predetermined working condition to load a spare wheel on each of vehicle bodies transported by a vehicle body carrying conveyor and a robot moving device for shifting the robot along a direction of transportation of the vehicle body to follow the vehicle body, and can load the spare wheel properly on a spare wheel holding portion provided in the vehicle body even though the speed of transportation of the vehicle body is varied due to slips between the vehicle body carrying conveyor and a driving device for driving the vehicle body carrying conveyor, aged deterioration of the vehicle body carrying conveyor or some other causes.

A further object of the present invention is to provide an apparatus for loading a spare wheel on a vehicle body, which includes a robot having an arm operating under a predetermined working condition to load a spare wheel on each of vehicle bodies transported by a vehicle body carrying conveyor and a robot moving device for shifting the robot along a direction of transportation of the vehicle body to follow the vehicle body, and in which a relative positional deviation between the vehicle body transported by the vehicle body carrying conveyor and the arm of robot is prevented substantially from arising so that the spare wheel can be loaded properly on a spare wheel holding portion provided in the vehicle body even though the speed of transportation of the vehicle body is varied due to slips between the vehicle body carrying conveyor and a driving device for driving the vehicle body carrying conveyor, aged deterioration of the vehicle body carrying conveyor or some other causes.

According to the present invention, there is provided an apparatus for loading a spare wheel on a vehicle body, which comprises a robot operating under predetermined working conditions to load the spare wheel on a predetermined portion provided in each of vehicle bodies supported and transported successively by carriers mounted on a vehicle body conveying device, a speed detecting device including a movable mechanism which engages temporarily with the carrier mounted on the vehicle body conveying device to move together with the carrier and detecting a speed of transportation of the vehicle body based on a speed of movement of the movable mechanism, and a robot moving device for shifting the robot along a direction of transportation of the vehicle body at a speed determined in response to the speed of transportation of the vehicle body detected by the speed detecting device.

In the apparatus thus constituted in accordance with the present invention, the movable mechanism included in the speed detecting device is moved at the same speed as the vehicle body supported and transported by the carrier mounted on the vehicle body carrying conveyor so that the speed of transportation of the vehicle body is detected by the speed detecting device based on the speed of movement of the movable member, and the robot moving device is operative to shift the robot along the direction of transportation of the vehicle body at the speed corresponding to the speed detected by the speed detecting device. Therefore, the robot is shifted at the same speed as the vehicle body supported and transported by the carrier mounted on the vehicle body carrying conveyor even though the speed of transportation of the vehicle body is varied due to slips between the vehicle body carrying conveyor and a driving device for driving the vehicle body carrying conveyor, aged deterioration of the vehicle body carrying conveyor or some other causes. As a result, a relative positional deviation between the vehicle body transported by the vehicle body carrying conveyor and the arm of robot does not arise substantially and the spare wheel is always loaded properly on the predetermined portion provided in the vehicle body.

Further, since the robot is shifted as mentioned above to load the spare wheel on the vehicle body, the spare wheel is loaded quite accurately on the vehicle body compared with a case in which a robot having an arm operative to load a spare wheel on a vehicle body is fixed to be stationary and the arm is rotated to follow the vehicle body transported by a vehicle body carrying conveyor.

The above, and other objects, features and advantages of the present invention will become apparent from the following detailed description which is to be read in conjunction with the accompanying drawings.

DESCRIPTION OF THE PREFERRED EMBODIMENT

The invention will now be described by way of example with reference to the accompanying drawings.

Figure 1:
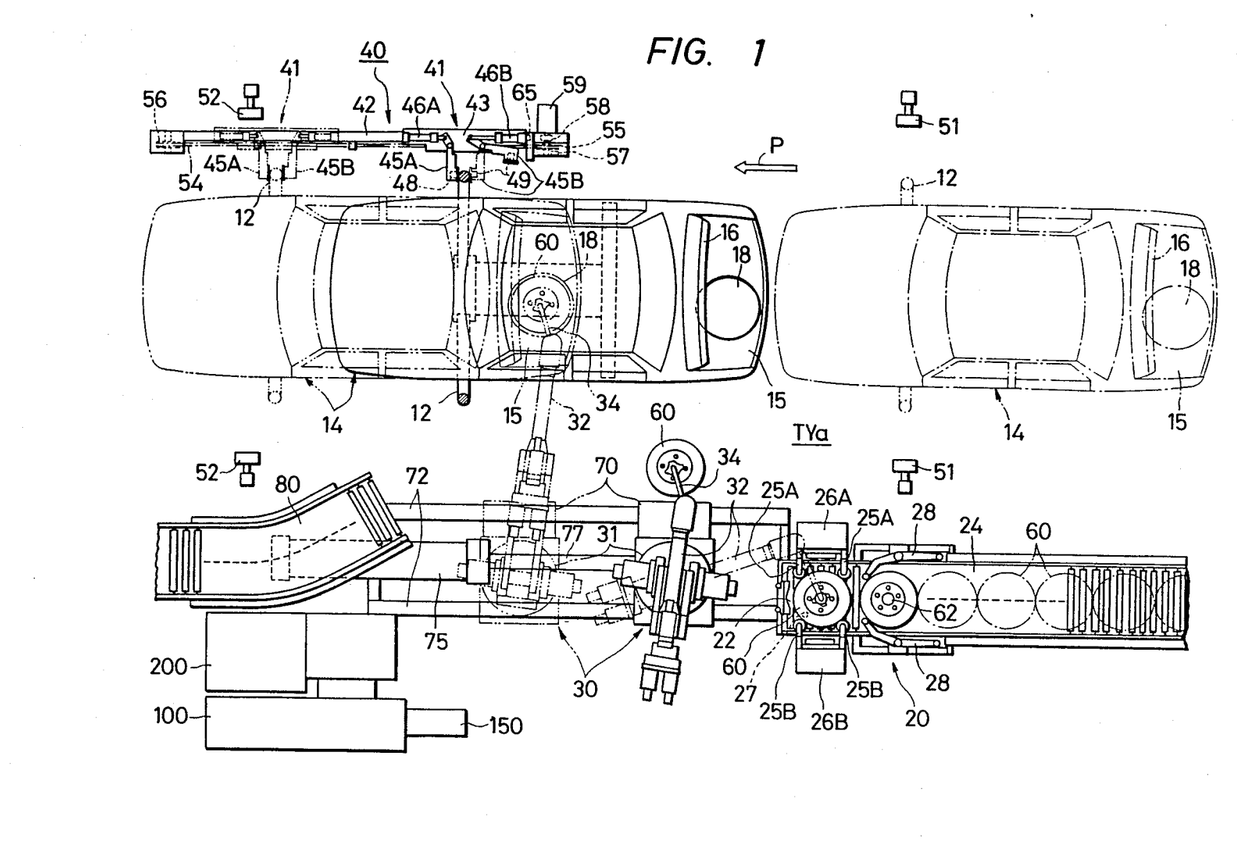
FIG. 1 is a schematic plan view showing a main part of embodiment of apparatus for loading a spare wheel on a vehicle body according to the present invention, together with a part of a vehicle assembly line to which the embodiment is applied.
Figure 2:
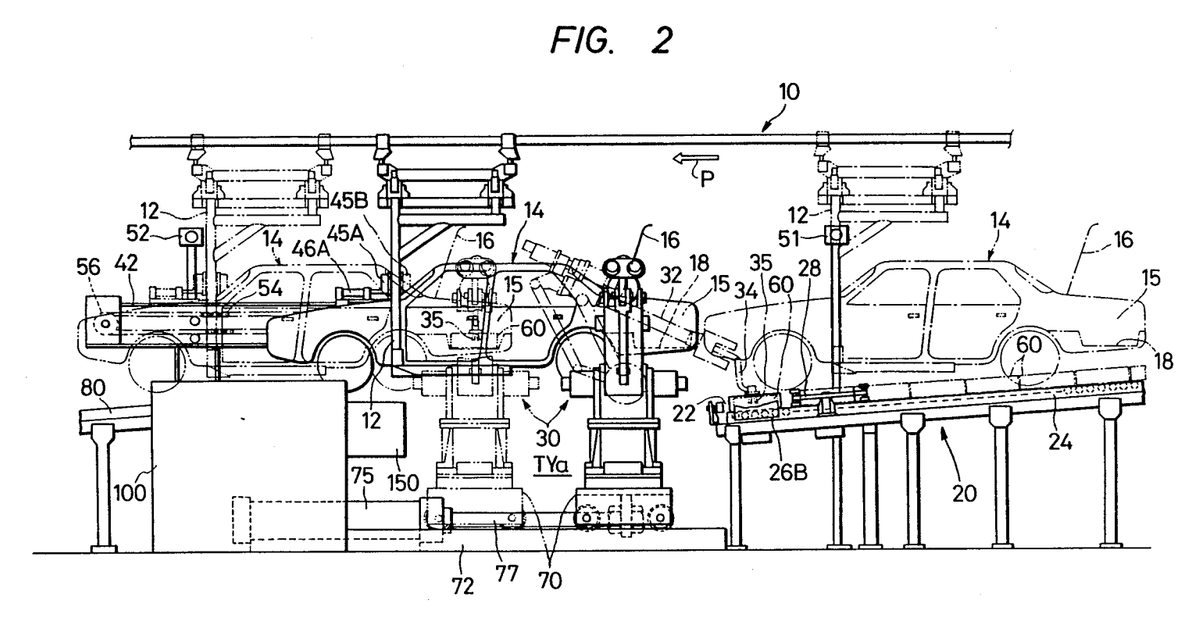
FIG. 2 is a schematic side view showing the main part of embodiment shown in FIG. 1 together with a part of a vehicle assembly line to which the embodiment is applied.

FIGS. 1 and 2 show one embodiment of apparatus for loading a spare wheel on a vehicle body according to the present invention, which is applied to a vehicle assembly line in which a plurality of vehicle bodies of several different types are assembled.

Referring to FIGS. 1 and 2, a trolley conveyor 10 of the overhead type on which hangers 12 for supporting and transporting vehicle bodies 14 are mounted is installed along the vehicle assembly line and driven by a driving device such as a motor (not shown in the drawings) to move the hangers 12 at a constant speed. Each of the vehicle bodies 14 supported and transported by the hangers 12 is supplied to a spare wheel loading station TYa so as to pass through the same slowly on the straight in a direction indicated by an arrow P (hereinafter, referred to as a transporting direction P) without stopping therein. When the vehicle body 14 is transported in the spare wheel loading station TYa, a spare wheel 60 is loaded on a spare wheel holding portion 18 provided in a trunk 15 of the vehicle body 14. The vehicle body 14 supplied to the spare wheel loading station TYa is so arranged that a trunk lid 16 is in the open state and supported by the hanger 12 so as to be positioned exactly at a predetermined position on the hanger 12 and so as not to have any positional deviation from the predetermined position on the hanger 12 unless a relatively large shock is given to the vehicle body 14.

The spare wheel loading station TYa is provided with a spare wheel supplying device 20, a robot 30 for loading the spare wheel 60 on the vehicle body 14, a speed detecting device 40 including a movable mechanism 41 which is operative to engage temporarily with the hanger 12 to move together with the hanger 12 in the transporting direction P for detecting a speed of transportation of the vehicle body 14, a robot controller 200 for controlling the operation of the robot 30, and a control unit 100 for controlling operations of various devices and mechanisms in the spare wheel loading station TYa, which constitute a main part of the embodiment of the present invention.

The spare wheel supplying device 20 comprises a positioning gate portion 22 from which the spare wheel 60 is supplied and a roller conveyor portion 24 slanted for conveying successively the spare wheels 60 which are supplied from wheel stock facilities (not shown in the drawings) to the positioning gate portion 22. The positioning gate portion 22 is provided with two pairs of positioning arms 25A and 25B, a pair of arm drivers 26A and 26B for driving the positioning arms 25A and the positioning arms 25B, respectively, and a detecting switch 27 for detecting the existence of the spare wheel 60. The roller conveyor portion 24 is provided with a pair of gate arms 28 for engaging with each of the spare wheels 60 on the roller conveyor portion 24 to hold the same at one end of the roller conveyor portion 24 close to the positioning gate portion 22.

The robot 30 is formed into a playback robot of the articulated type having an arm 32 and a wrist 34 extending from the arm 32, which can operate with movements similar to the movements of the upper limbs of mankind. The arm 32 is mounted on a base 31 fixed on a carriage 70 to be rotatable horizontally and swingable vertically in relation to the base 31 and the wrist 34 is arranged to be rotatable around an axis of the arm 32 and in a plane including the axis of the arm 32. The wrist 34 is provided at its end portion with a chuck member 35 which engages with a center hole 62 of the spare wheel 60 to catch the spare wheel 60. Working conditions for the robot 30 including a working path along which the chuck member 35 operates and a working speed at which the chuck member 35 moves are predetermined manually or through a numerical control and stored in a memory contained in the robot controller 200.

The carriage 70 on which the robot 30 is installed is put on a pair of parallel guide rails 72 extending along the transporting direction P and moved along the guide rails 72 by a piston rod 77 of a robot moving cylinder 75 which is provided in parallel to the guide rails 72.

The movable mechanism 41 included in the speed detecting device 40 comprises a slidable base unit 43 for sliding on a guide rail 42 fixed to extend along the transporting direction P, a pair of engaging arms 45A and 45B each connected to be rotatable through a pin with the sliding base unit 43 for engaging with the hanger 12 to hold the same, a cylinder 46A having a piston rod connected through a pin with a rear end portion of the engaging arm 45A for rotating the engaging arm 45A selectively to project from the slidable base unit 43 for engaging with the hanger 12 and to lie on the slidable base unit 43 for disengaging from the hanger 12, a cylinder 46B having a piston rod connected through a pin with a rear end portion of the engaging arm 45B for rotating the engaging arm 45B selectively to project from the slidable base unit 43 for engaging with the hanger 12 and to lie on the slidable base unit 43 for disengaging from the hanger 12, a limit switch 48 provided on an end portion of the engaging arm 45A so as to be in the ON state when the engaging arm 45A is engaged with the hanger 12 and to be in the OFF state when the engaging arm 45A is disengaged from the hanger 12, and a limit switch 49 provided on an end portion of the engaging arm 45B so as to be in the ON state when the engaging arm 45B is engaged with the hanger 12 and to be in the OFF state when the engaging arm 45B is disengaged from the hanger 12. For detecting a speed of movement of the movable mechanism 41 in the transporting direction P, sprocket wheels 55 and 56 are mounted on both end portions of the guide rail 42, respectively, to be engaged with an endless chain 54 which is connected at a portion thereof with the slidable base unit 43 and a speed sensor 57 for detecting a speed of rotation of the sprocket wheel 55 is attached to the guide rail 42 to be close to the sprocket wheel 55. A rotating axis of the sprocket wheel 55 is coupled through an electromagnetic clutch device 58 with a motor 59 which is provided for causing the slidable base unit 43 to return to a reference position on the guide rail 42. (The slidable base unit 43 shown in FIGS. 1 and 2 is positioned at the reference position.) The slidable base unit 43 returned to the reference position is detected by a limit switch 65 fixed on the guide rail 42.

Figure 3:
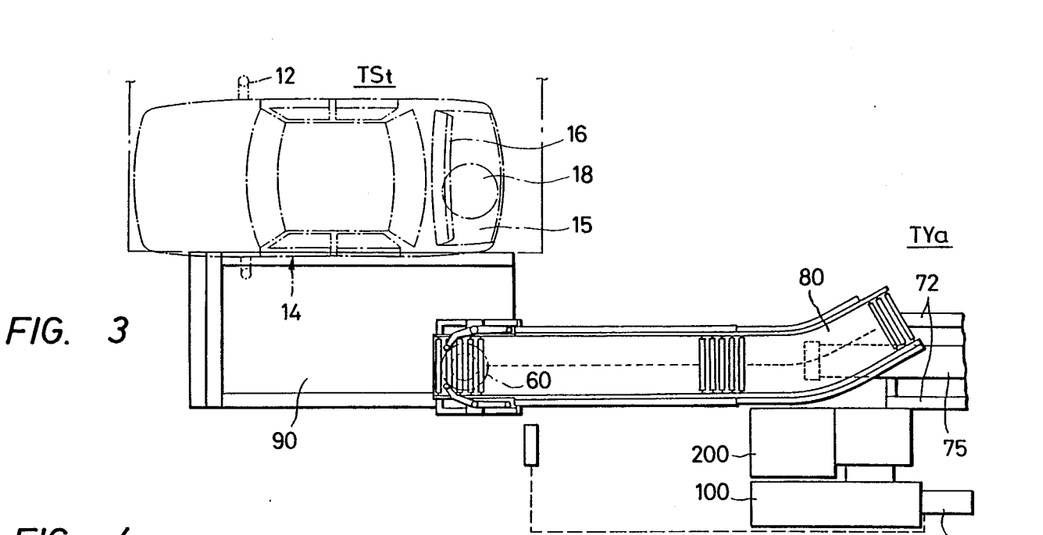
FIG. 3 is a schematic plane view showing a portion of the embodiment shown in FIGS. 1 and 2.
Figure 4:
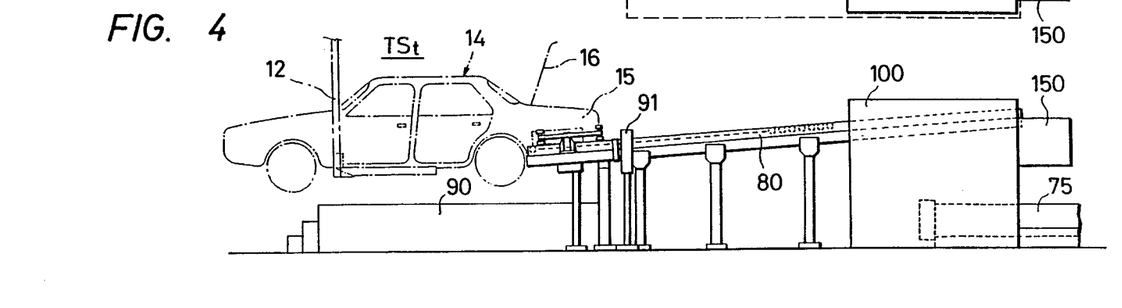
FIG. 4 is a schematic side view showing the portion of the embodiment shown in FIG. 3.

In the spare wheel loading station TYa, a roller conveyor 80 for transfer the spare wheel 60 to the outside of the spare wheel loading station TYa, which constitutes a portion of the apparatus according to the present invention, is installed, and further an operation unit 150 for causing the robot 30 to perform a predetermined operation is also provided. As shown in FIGS. 3 and 4, the roller conveyor 80 is slanted and extends to a spare wheel filling-up station TSt which is provided next to the spare wheel loading station TYa in the vehicle assembly line, and a working stage 90 and a warning device 91 are provided in association with the roller conveyor 80 in the spare wheel filling-up station TSt.

In the event of an abnormal situation in which the spare wheel 60 is unable to be loaded on the vehicle body 14 by the robot 30 in the spare wheel loading station TYa because of some trouble caused on the trolley conveyor 10 or any other device or mechanism in the spare wheel loading station TYa, the operation unit 150 which detects such an abnormal situation in any known manner, and supplies a warning signal to the warning device 91 and the warning device 91 issues a warning by means of, for example, a warning lamp, in response to the warning signal from the operation unit 150. Simultaneously with this, the spare wheel 60 which is to be loaded on the vehicle body 14 but has failed to be loaded on the vehicle body 14 in the spare wheel loading station TYa is placed on the roller conveyor 80 in the spare wheel loading station TYa and transferred from the spare wheel loading station TYa to the spare wheel filling-up station TSt through the roller conveyor 80. The spare wheel 60 supplied through the roller conveyor 80 to the spare wheel filling-up station TSt is loaded on the spare wheel holding portion 18 provided in the trunk 15 of the vehicle body 14, which has been transported by the hanger 12 to the spare wheel filling-up station TSt from the spare wheel loading station TYa without any spare wheel, by a worker who has been given a notice of the abnormal situation by the warning device 91 at the working stage 90. The worker who works for loading the spare wheel 60 on the vehicle body 14 at the working stage 90 is, for example, usually engaged in attaching front and rear wheels to the vehicle body 14 in a wheel mounting station provided next to the spare wheel filling-up station TSt and conducts the work at the working stage 90 only when the warning device 91 issues the warning.

Besides, photoelectric switches 51 and 52 each consisting of a light source and a photodetector are fixed in the spare wheel loading station TYa for detecting a condition where the vehicle body 14 supported by the hanger 12 has been transported to a predetermined location in the spare wheel loading station TYa. Each of the photoelectric switches 51 detects the hanger 12 and produces a detection output signal Sa to be supplied to the control unit 100 when the hanger 12 supporting and transporting the vehicle body 14 passes through a predetermined location at the side of entrance of the spare wheel loading station TYa, and each of the photoelectric switches 52 detects the hanger 12 and produces a detection output signal Sb to be supplied to the control unit 100 when the hanger 12 supporting and transporting the vehicle body 14 passes through a predetermined location at the side of exit of the spare wheel loading station TYa.

Figure 5:
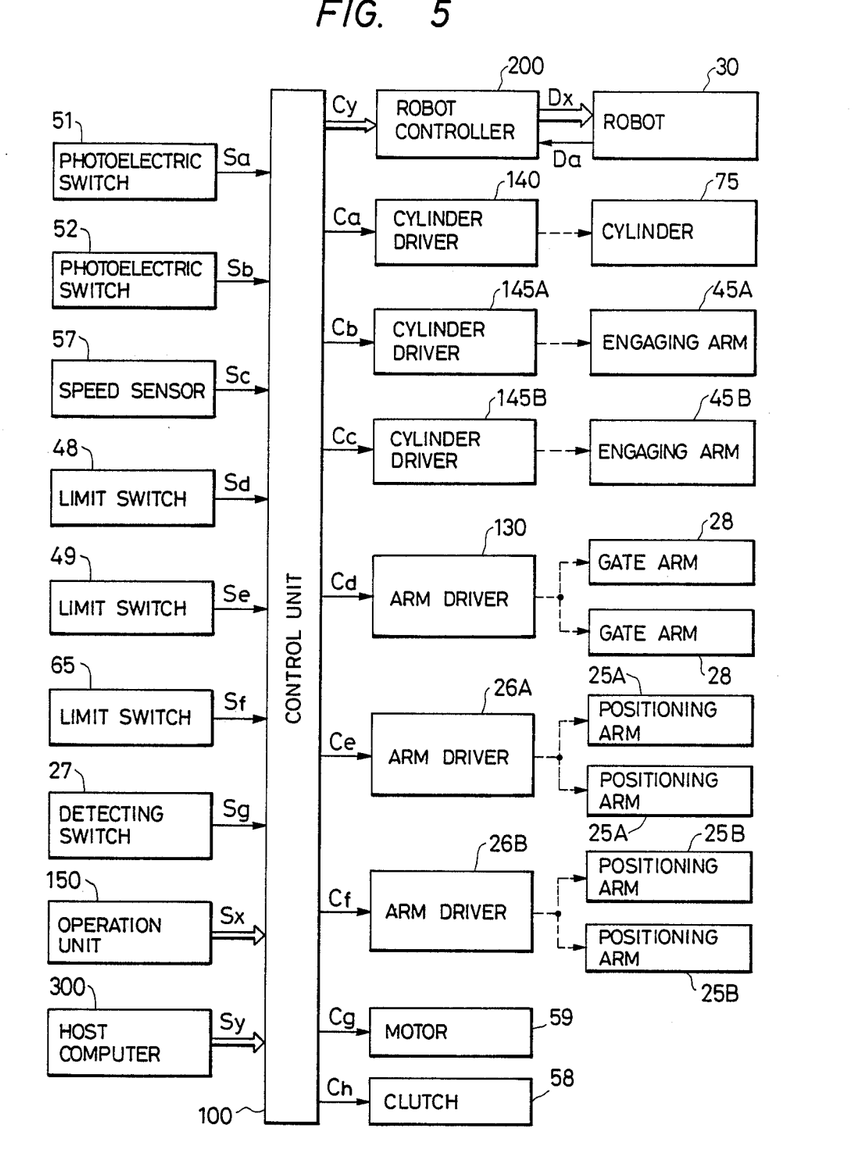
FIG. 5 is a schematic block diagram showing an example of a control system used in the embodiment shown in FIGS. 1 and 2.

As shown in FIG. 5, the control unit 100 is supplied with, in addition to the detection output signals Sa and Sb from the photoelectric switches 51 and 52, a signal Sc obtained from the speed sensor 57 and representing the speed of movement of the movable mechanism 41 in the transporting direction P, which corresponds to the speed of rotation of the sprocket wheel 55, signals Sd, Se and Sf obtained respectively from the limit switches 48, 49 and 65, a signal Sg obtained from the detecting switch 27, and a group of signals Sx including the warning signal and obtained from the operation unit 150. In addition, a host computer 300 is connected to the control unit 100 and a group of signals Sy including a signal representing information of a type of a vehicle to be assembled and obtained from the host computer 300 is also supplied to the control unit 100.

Then, the control unit 100 supplies the robot controller 200 with a seizing command signal Cy representing a standby command, a loading start command and other necessary commands produced in response to the information of the type of the vehicle represented by the group of signals Sy from the host computer 300. The robot controller 200 receiving the seizing command signal Cy produces a robot control signal Dx in response with each type of the vehicle based on the seizing command signal Cy and supplies the same to the robot 30. As a result, the robot 30 operates in accordance with the robot control signal Dx so that the chuck member 35 moves along a predetermined working path and at a predetermined working speed, and supplies the robot controller 200 with a operation signal Da representing the operation thereof.

The control unit 100 further supplies, in response to the signals fed thereto, a cylinder driver 140 which comprises a working pressure oil source and a oil flow control valve and provided for controlling the operation of the robot moving cylinder 75 with a control signal Ca, and also supplies a cylinder driver 145A for controlling the operation of the engaging arm 45A, a cylinder driver 145B for controlling the operation of the engaging arm 45B, an arm driver 130 for controlling the operation of each of the gate arms 28, the arm driver 26A for controlling the operation of each of the positioning arms 25A, the arm driver 26B for controlling the operation of each of the positioning arms 25B, the motor 59 and the electromagnetic clutch device 58 with control signals Cb, Cc, Cd, Ce, Cf, Cg and Ch, respectively.

With such configurations of the respective portions as mentioned above, when the spare wheel 60 is loaded on the vehicle body 14 conveyed by the hanger 12 into the spare wheel loading station TYa so as to pass through the same slowly without stopping therein, the devices and mechanisms in the spare wheel loading station TYa operate as explained below.

First, before the vehicle body 14 reaches such a location as to shown by dot-dash lines in FIGS. 1 and 2, that is, before the hanger 12 passes the photoelectric switch 51, the control signal Cd is supplied to the arm driver 130 from the control unit 100 for a predetermined period and thereby the gate arms 28 are opened for the predetermined period when the signal Sg supplied to the control unit 100 from the detecting switch 27 indicates that the spare wheel 60 has not been supplied to the positioning gate portion 22. With this operation of each of the gate arms 28, the spare wheel 60 is supplied to the positioning gate portion 22 from the roller conveyor portion 24 and the detecting switch 27 is turned on to produce the signal Sg which indicates that the spare wheel 60 has been supplied to the positioning gate portion 22. Then, the control signals Ce and Cf are supplied respectively to the arm drivers 26A and 26B from the control unit 100 and thereby the arm drivers 26A and 26B operate to move the positioning arms 25A and 25B which are pulled in toward the arm drivers 26A and 26B to project toward the spare wheel 60 by a predetermined stroke and come into contact with the spare wheel 60, so that the spare wheel 60 is positioned at the center of the positioning gate portion 22 by the positioning arms 25A and 25B.

After the spare wheel 60 has been positioned on the positioning gate portion 22, the seizing command signal Cy is supplied to the robot controller 200 from the control unit 100 in response to the signal Sa obtained from the photoelectric switch 51 when the hanger 12 passes the photoelectric switch 51. Then, the robot control signal Dx for causing the robot 30 to catch the spare wheel 60 positioned on the positioning gate portion 22 and be on standby is supplied to the robot 30 from the robot controller 200, and thereby the robot 30 operates to move the chuck member 35 along the predetermined working path and at the predetermined working speed so as to catch the spare wheel 60 by the chuck member 35, as shown with dot-dash lines in FIGS. 1 and 2, and to rotate counterclockwise to take a position for being on standby, as shown by solid lines in FIGS. 1 and 2. On such occasion, the piston rod 77 of the robot moving cylinder 75 is extended to the maximum and the carriage 70 on which the robot 30 is installed is positioned at a reference position on the guide rails 72.

When the robot 30 is standing by as described above, the movable mechanism 41 is returned to a reference position on the guide rail 42 by the motor 59, as shown by solid lines in FIGS. 1 and 2 in the speed detecting device 40. The engaging arm 45A is caused to project from the slidable base unit 43 by the cylinder 46A and the engaging arm 45B is caused to lie on the slidable base unit 43 by the cylinder 46B. Further, each of the limit switches 48, 49 and 65 is in the OFF state, the motor 59 is inoperative, and the electromagnetic clutch device 58 is in the disengaged state.

After that, the vehicle body 14 is advanced further in the transporting direction P and the hanger 12 comes to engagement with the engaging arm 45A, as shown by solid lines in FIGS. 1 and 2, so as to move the engaging arm 45A along the transporting direction P. Accordingly, both of the limit switches 48 and 65 are turned on and the slidable base unit 43 is caused to slide along the guide rail 42. Then, the control unit 100 detects the movement of the slidable base unit 43 based on the signal Sd obtained from the limit switch 48 and supplies the cylinder driver 145B with the control signal Cc. The cylinder driver 145B causes the cylinder 46B to operate in response to the control signal Cc and the engaging arm 45B is caused to project from the slidable base unit 43 to engage with the hanger 12. Consequently, the hanger 12 is put between the engaging arms 45A and 45B and the limit switch 49 is turned on.

The control unit 100 detects that the limit switch 49 is turned on, based on the signal Se obtained from the limit switch 49, and commences to supply the robot controller 200 with the seizing command signal Cy representing the loading start command and the cylinder driver 140 with the control signal Ca. The robot controller 200 supplies the robot 30 with the robot control signal Dx, in response to the seizing command signal Cy, for causing the robot 30 to operate to load the spare wheel 60 on the vehicle body 14, and thereby the robot 30 commences a predetermined operation for loading the spare wheel 60 on the spare wheel holding portion 18 in the trunk 15 of the vehicle body 14 and the robot moving cylinder 75 also commences to pull the piston rod 77 thereinto. Although a time difference between a time point at which the limit switch 48 is turned on and a time point at which the limit switch 49 is turned on after the limit switch 48 is so short as to be able to be ignored, the robot controller 200 controls the operation of the robot 30 for loading the spare wheel on the vehicle body in consideration of such a time difference as mentioned above for the purpose of making the operation for loading the spare wheel 60 on the vehicle body 14 accurate in a high degree.

The vehicle body 14 which advances from the position shown by solid lines in FIGS. 1 and 2 in the transporting direction P is accompanied with the movable mechanism 41 which has the engaging arms 45A and 45B both engaging with the hanger 12 supporting the vehicle body 14 and moves in the transporting direction P at the same speed as the vehicle body 14. The speed of movement of the movable mechanism 41 is detected by the speed sensor 57 and the signal Sc obtained from the speed sensor 57 for representing the detected speed is supplied to the control unit 100. The control unit 100 produces based on the signal Sc the control signal Ca varying in response to the speed of movement of the movable mechanism and supplies the same to the cylinder driver 140. Then, the cylinder driver 140 controls the working pressure oil supplied to the robot moving cylinder 75 in response to the control signal Ca so that the robot moving cylinder 75 operates to pull the piston rod 77 thereinto at a speed coincident with the speed of movement of the movable mechanism 41.

With the control thus carried out by the control unit 100, the robot 30 installed on the carriage 70 is shifted on the guide rails 72 in the transporting direction P at the same speed as the vehicle body 14 supported and transported by the hanger 12, and during such a movement of the robot 30 accompanying with the vehicle body 14, a wheel loading operation of the robot 30 is performed for moving the chuck member 35 by which the spare wheel 60 is caught into the trunk 15 of the vehicle body 14 without interference with any portion of the vehicle body 14 and placing the spare wheel 60 caught by the chuck member 35 on the spare wheel holding portion 18 provided in the trunk 15 of the vehicle body 14, as shown by double dot-dash lines in FIGS. 1 and 2. In such wheel loading operation of the robot 30, since the robot 30 is shifted in the transporting direction P at the same speed as the vehicle body 14 supported and transported by the hanger 12 even though the speed of transportation of the vehicle body 14 is varied due to slips between the trolley conveyor 10 and the driving device for driving the trolley conveyor 10, aged deterioration of the trolley conveyor 10 or some other causes, the spare wheel 60 is placed always properly on the spare wheel holding portion 18 provided in the trunk 15 of the vehicle body 14. Further, since the chuck member 35 of the robot 30 is moved along the predetermined working path and at the predetermined working speed so as to catch the spare wheel 60 and place the same on the vehicle body 14, the spare wheel 60 is placed quite accurately on the spare wheel holding portion 18 provided in the trunk 15 of the vehicle body 14, compared with a case in which a robot having an arm operative to load a spare wheel on a vehicle body is fixed to be stationary and the arm is rotated to follow the vehicle body transported by a vehicle body carrying conveyor.

After the spare wheel 60 is placed on the spare wheel holding portion 18 provided in the vehicle body 14 as described above, the chuck member 35 of the robot 30 releases the spare wheel 60 to load the same on the spare wheel holding portion 18 and the arm 32 and the wrist 34 of the robot 30 are moved to return to their reference positions without interfering with the vehicle body 14. Then, the signal Sb is supplied to the control unit 100 from the photoelectric switch 52 when the hanger 12 passes the photoelectric switch 52. The control unit 100 ceases to supply the cylinder drivers 145A and 145B respectively with the control signals Cb and Cb, supplies the motor 59 and the electromagnetic clutch device 58 respectively with the control signals Cg and Ch, and ceases to supply the cylinder driver 140 with the control signal Ca, in response to the signal Sb from the photoelectric switch 52.

With such operation of the control unit 100, each of the engaging arms 45A and 45B is disengaged from the hanger 12 to lie on the guide rail 42, the motor 59 is rotated, and the electromagnetic clutch device 58 is caused to be in the engaged state, so that the movable mechanism 41 is caused to slide on the guide rail 42 in a direction opposite to the transporting direction P to return to the reference position on the guide rail 42. As a result, the limit switch 65 is turned off and therefore the movable mechanism 41 is returned to such a position as shown by solid lines in FIGS. 1 and 2 with the engaging arm 45A projecting from the guide rail 42. Further, the robot moving cylinder 75 operates to push the piston rod 77 out thereof so as to return the carriage 70 on which the robot 30 is installed to the reference position on the guide rails 72 and the robot 30 is caused to be ready for loading one of the spare wheels 60 on the vehicle body 14 supplied subsequently to the spare wheel loading station TYa.

What is claimed is:

1. An apparatus for loading a spare wheel on a vehicle body comprising;
    a carrier for supporting and transporting the vehicle body including a hanger mounted on a conveyor of the overhead type for continuously conveying said vehicle body by said hanger.
    a robot operating under predetermined working conditions to load the spare wheel on a predetermined portion provided in the vehicle body supported and transported by said carrier,
    speed detecting means including a movable mechanism including an engaging means for temporarily engaging with said hanger on the vehicle body conveying device to move together with the carrier and for detecting a speed of transportation of the vehicle body based on a speed of movement of the movable mechanism, said engaging means comprising a pair of engaging arms each provided with an end portion for contacting said hanger, said engaging arms facing each other with a portion of said hanger between respective end portions of said engaging arms upon engagement with said hanger, robot moving means for shifting said robot along a direction of transportation of the vehicle body at a speed determined in response to the speed of transportation of the vehicle body detected by said speed detecting means.

2. An apparatus according to claim 1, wherein said robot is provided with a rotatable arm member, a wrist member extending from said rotatable arm member, and a chuck member attached to an end portion of said wrist member for catching the spare wheel.

3. An apparatus according to claim 2, wherein said chuck member is formed to engage with a center hole of the spare wheel.

4. An apparatus according to claim 1, wherein each of said engaging arms is mounted to be rotatable on said movable mechanism and said movable mechanism further comprises actuating means for rotating each of said engaging arms individually.

5. An apparatus according to claim 4, wherein said actuating means comprises a couple of cylinder devices coupled with another end portions of said engaging arms, respectively.

6. An apparatus according to claim 1, wherein said robot moving means comprises a carriage on which said robot is fixed, guiding means extending along the direction of transportation of the vehicle body for guiding said carriage, driving means for moving said carriage along said guide means, and control means for controlling an operation of said driving means in response to the speed of transportation of the vehicle body detected by said speed detecting means.

7. An apparatus according to claim 6, wherein said driving means comprises a cylinder device fixed in parallel to said guiding means with a piston rod connected at its end to said carriage and expanding and contracting along said guide means.

8. An apparatus according to claim 1, further comprising an operation control unit for detecting an abnormal situation in which a specific spare wheel has failed to be loaded on the vehicle body, and a spare wheel conveying means for transferring said specific spare wheel to a predetermined location, wherein said operation control unit operates said robot to transfer said specific spare wheel to said spare wheel conveying means in response to said abnormal condition.

* * * * *